United States Patent

Spilner

[15] 3,681,475

[45] Aug. 1, 1972

[54] THERMOPLASTIC MOLDING COMPOSITIONS

[72] Inventor: Allan John Spilner, Gladwyne, Pa.

[73] Assignee: Rohm and Haas Company, Philadelphia, Pa.

[22] Filed: Oct. 6, 1969

[21] Appl. No.: 864,148

[52] U.S. Cl........260/876 R, 260/23 AR, 260/859 R, 260/885, 260/887, 260/901
[51] Int. Cl........C08d 9/10, C08f 37/18, C08g 41/04
[58] Field of Search..........................260/876 R, 901

[56] References Cited

UNITED STATES PATENTS

| | | | |
|---|---|---|---|
| 3,461,188 | 8/1969 | Baer | 260/876 |
| 3,502,604 | 3/1970 | Nakatsuka et al. | 260/901 |

FOREIGN PATENTS OR APPLICATIONS

| | | | |
|---|---|---|---|
| 1,001,953 | 8/1965 | Great Britain | 260/876 |
| 965,786 | 8/1964 | Great Britain | 260/901 |
| 722,223 | 11/1965 | Canada | 260/876 |
| 684,751 | 4/1964 | Canada | |

*Primary Examiner*—Samuel H. Blech
*Assistant Examiner*—Helen W. Roberts
*Attorney*—Thomas A. Lennox, G. W. F. Simmons and C. A. Castellan

[57] ABSTRACT

Rigid acrylic thermoplastic molding compositions are provided with improved extensibility and processability. The molding compositions comprise acrylic thermoplastic polymer modified with up to 5 percent elastomer. Preferred are durable compositions comprising acrylic polymers modified with acrylic elastomers.

10 Claims, No Drawings

THERMOPLASTIC MOLDING COMPOSITIONS

Rigid thermoplastic polymers are a class of compounds well known in the art. This class of compounds is widely used because of the balance of physical properties, economy, availability, and lack of suitable substitutes. These rigid thermoplastics include acrylic polymers, such as poly(methyl methacrylate) and the many copolymers of methyl methacrylate and the modified versions thereof, polystyrene and copolymers of styrene such as styrene-acrylonitrile and the like, and other rigid thermoplastic polymers.

These thermoplastic polymers, being rigid, are susceptible to breakage during the processing of the plastic part, and during the use of the plastic part. A particular deficiency is the breakage occurring during the removal of the injection or compression molded part from the mold. It is known that large quantities of elastomeric materials may be added to these rigid thermoplastic polymers to provide improved resistance to sharp, high velocity impact. These elastomers are generally added in massive quantities, at least greater than 7 percent and generally at least 15 percent based on the weight of the molding composition. At the 20 percent elastomer level, the impact strength of polymethyl methacrylate is slightly improved but 25 to 30 percent elastomer is required to produce a truly impact resistant material. The addition of large amounts of elastomeric materials severely affects the physical characteristics of the molding composition. The modulus, durability, scratch resistance, clarity, and other physical characteristics are generally affected to a major degree.

As indicated above, a major deficiency of rigid thermoplastics, particularly the rigid acrylics, is the high reject rate due to cracking and breakage of the molded parts during the ejection from the mold. This deficiency is not associated with impact resistance but rather cracking and breakage at elevated temperatures and under conditions the plastic part would generally not be subjected to in actual use conditions. Molding conditions vary greatly from part to part, from mold to mold, from machine to machine, and from molding to molding even on the same day due to changes in conditions not easily controlled. Thus, there is a great need for rigid thermoplastic molding compositions that provide essentially the same physical characteristic as the unmodified compositions but offer reduced reject rates during processing and other advantages.

It is, accordingly, an object of the present invention to provide rigid thermoplastic molding compositions with improved processing characteristics. It is further an object to provide molding compositions which resist breakage during processing but provide a balance of physical characteristics approximately equal to or better than the unmodified rigid thermoplastic polymer. It is a further object to provide a rigid thermoplastic composition with improved ductility under low rates of stress. The present invention realizes the above objects and reduces or eliminates the deficiencies of the compositions in the prior art.

The invention comprises the addition of a relatively small amount of elastomeric material to the rigid thermoplastic polymer to yield improved molding compositions. The amount of the elastomeric material in the present invention is small by comparison with the amounts of elastomeric material normally added to obtain resistance to impact.

The amount of elastomer in the molding composition varies greatly depending upon the type of elastomer, the type of rigid thermoplastic polymer, the particular processing difficulty encountered, and the physical characteristics desired in the final product. It is generally desirable to include at least 0.5 weight percent elastomer in the molding composition to provide significant and commercially important improvements in the processing and physical characteristics of the molding composition. As the elastomer concentration is increased past 5 weight percent, certain physical characteristics of the molding compositions are adversely affected and the compositions may no longer be considered essentially equivalent to that of the unmodified thermoplastic composition. The physical characteristics adversely affected at the high elastomer concentration include modulus, turbidity, hardness, and shrinkage at high service temperatures. Preferably, the elastomer content ranges from 0.5 to 4.5 percent by weight of the molding composition more preferably 1 to 4.5 percent and most preferably is present in the range of 1 to 4.0 percent by weight of the molding composition. Respectively, the molding composition comprises 99.5 to 95.5, 99 to 95.5, and 99 to 96 percent by weight rigid thermoplastic polymer.

The compositions of this invention offer a number of characteristics and improvements are not available in the unmodified compositions of the prior art. These characteristics include ductility or elongation, particularly in thin sections. This ductility may be measured in the laboratory by tensile elongation and may range up to two to four times the amount obtained with the unmodified rigid thermoplastic. The ductility may also be measured by flexural deflection is increased up to 1.5 to 2 times that obtained with the unmodified rigid thermoplastic. The compositions of this invention also provide significant and important improvements in resistance to cracking and breaking during molding processes, particularly in injection molding equipment. Those parts which are particularly difficult to mold provide the most significant improvement when the compositions of this invention are used. The concentrations of elastomer used in this invention are much too low to provide a significant improvement in impact strength. The other physical characteristics such as light transmittance, heat distortion temperature, haze, modulus, and other physical characteristics are not significantly or substantially impaired by the inclusion of the elastomer in the concentrations of this invention.

The compositions of this invention comprise the elastomer ans the rigid thermoplastic. Mixtures of the elastomer and the rigid thermoplastic are generally referred to as molding compositions. In some circumstances the elastomer will be referred to as the elastomeric phase and the rigid thermoplastic will be referred to as the hard phase. It may be desirable to include a portion of a hard phase attached to or mixed with the elastomeric phase to provide ease of handling and processability before and after mixture with the remainder of the hard phase. The attachment of the hard phase to the elastomeric phase may be physical or chemical and includes graft copolymers.

The rigid thermoplastics of this invention include the class known in the art as acrylic polymers. These polymers may be described as having the majority of acrylic units in the polymer. This entire class of acrylic polymers has the deficiency regarding breakage during the molding process. The acrylic thermoplastic polymers as a class and as used in this specification may be more narrowly considered durable acrylic interpolymers containing minor amounts (0 to 10 percent) of non-acrylic units and mixtures of all acrylic polymers with minor amounts of non-acrylic polymers to provide well-known balances of physical characteristics. Acrylic units are alkyl and aryl methacrylates and acrylates. As used in this specification the group alkyl also includes cycloalkyl, bridged and unbridged, while the group aryl also includes aralkyl and alkaryl. All these groups may be substituted or unsubstituted. These acrylic polymers have a heat distortion temperature greater than about 50° C., for most general purpose applications. Acrylic polymers of this invention include copolymers of 50 to 100 percent methyl methacrylate containing one or more comonomers in quantities 0 to 50 percent such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkthiol esters, and other substitutions, and 0 to 10 percent of other unsaturated monomers including acrylonitrile and methacrylanitrile, styrene monomers and substituted styrene monomers, vinyl esters, vinyl ethers, vinyl amides, vinyl ketones, vinyl halides, vinylidene halides, and olefins. Generally as the comonomer system chosen is softer, less is used in order to retain the rigid characteristics desired. The acrylic polymers of this invention include those polymers containing the units of at least 50 percent by weight of the esters of acrylic and/or methacrylic acid, preferably alkyl esters.

Typical of the monomers which may be used to prepare the acrylic polymers include esters of acrylic and methacrylic acid such as methyl, ethyl, n-propyl, isopropyl, n-butyl, isobutyl, 2-ethylhexyl, stearyl, cyclohexyl, isobornyl, bornyl, fenchyl, isofenchyl, norbornyl, adamantyl, benzyl, phenyl and the like. Preferred are those alkyl esters of methacrylic and acrylic acids wherein the alkyl group contains one to four carbon atoms. The preferred cycloalkyl esters of methacrylic and acrylic acids have cycloalkyl group containing four to 14 carbon atoms. The substituted esters of methacrylic acid and acrylic acid include chlorine and bromine substituted lower alkyl esters; alkoxy substituted lower alkyl esters such as ethoxy, methoxy; alkylthio substituted lower alkyl esters such as ethylthio and methylthio; cyanoalkyl substituted lower alkyl esters such as cyanoethyl and the like. Styrene monomers include halogen styrenes, vinyl toluene, t-butyl styrene, and the like. Vinyl halides and vinylidene halides wherein the halides include chloride, bromide, and fluoride. Olefins include ethylene, propylene, isobutylene and the like.

The elastomers within the embodiment of this invention include what may be broadly described as durable and nondurable types. An example of the durable type elastomer is the acrylic elastomer. Many factors enter into durability of the final product. At the levels of elastomer used in this invention, the effect on the durability of the final product by elastomer is considerably less than might be expected. The more durable elastomers include the acrylic elastomers, the polyester-urethane elastomers, the polyether-urethane elastomers, nd other elastomers well known in the art.

The acrylic elastomers include homopolymers and copolymers containing major proportions of alkyl and aryl acrylates. The acrylic elastomer comprises at least 50 percent of these acrylic unit. The alkyl esters of acrylic acid have alkyl groups of one to 15 carbon atoms, preferably one to eight and most preferably two to eight carbon atoms. Longer chain alkyl groups may be used. Aralkyl esters of acrylic acid wherein the cyclic portion contains five, six, or seven carbon atoms with or without an additional alkyl bridge, and the alkyl portion of the aralkyl group contains up to 15 carbon atoms may also be used. The substituted acrylates include alkythioalkyl acrylates such as ethylthioethyl acrylate, etc., alkoxyalkyl acrylates, such as methoxyethyl acrylate, etc. Interpolymers with these acrylates may be based on one or more of other monomers such as styrene, alkyl methacrylates, acrylonitrile and methacrylonitrile, olefins, vinyl ethers, amides, and esters, vinyl and vinylidene halides, and the like. Preferred are those acrylic elastomers prepared from polyfunctional monomers capable of cross-linking the elastomer, such as polyethylenically unsaturated monomers like polyacrylates and polymethacrylates, and monomers capable of ionic and co-ordinate cross-linking such as acid groups and organic and inorganic bases and other electron donating groups coordinating with suitable electrophilic agents. The cross-linked elastomers are referred to as gelled interpolymers to describe that physical characteristic of the polymers. The polyethylenically unsaturated monomers include polyacrylic and polymethacrylic esters of polyols such as 1,3 butylene diacrylate and dimethacrylate, trimethyolpropane trimethacrylate, and the like di-and-trivinyl benzene, vinyl acrylate and methacrylate, allyl and methallyl acrylates and methacrylates, bis-acrylamides and bis-methacrylamides and other cross-linking monomers. These acrylic elastomers may — as may many of the other elastomers — be prepared in bulk, in suspension, in emulsion, or in solution polymerization procedures. These elastomers may be prepared in one stage or in multi-stage preparations. As indicated earlier, these elastomers may be prepared in sequential stages under conditions to provide physical and/or chemical attachment between the stages. These stages may be of varying hardness and may range from the softest elastomer to the hardest rigid phase to provide improved handling characteristics and processability, and to provide improved dispersibility in the rigid thermoplastic. The elastomer may contain chain transfer agents in either one or all of the phases and any or all of the phases may contain polyfunctional monomers to provide cross-linking. The acrylic elastomers include polyalkyl acrylates wherein the alkyl group contains 1 to 8 carbon atoms and is branched or unbranched; the elastomer being cross-linked with a polyunsaturated monomer. These crosslinked polyacrylates are then attached to hard phase polymers such as alkyl methacrylates. These elastomers are most easily prepared in emulsion or suspension wherein the alkyl methacrylate hard phase is polymerized onto the particles of the cross-linked acrylate elastomer held in suspension.

Throughout the specification, the term "elastomer" refers to that amount of the elastomeric phase and does not include hard phases polymerized on the elastomer. Thus, a modifier containing three parts of an alkyl acrylate elastomer on which is polymerized one part of the hard alkyl methacrylate would add only three parts of the elastomer to the rigid thermoplastic.

The polyester-urethane elastomers are prepared from a diisocyanate compound and one or more compounds containing active hydrogen functionality, one of which is a polyester. Examples of polyester-urethane elastomers include elastomers prepared by isocyanates, both of the aliphatic and aromatic types, a saturated or unsaturated polyester, preferably a hydroxyl terminated polyester, and optionally other active hydrogen containing compounds including alkane diols, both saturated and unsaturated, hydroxyalkyl esters of acrylic and methacrylic acid, and the like. These elastomers are commonly prepared in bulk or in solution.

Polyether-urethane elastomers may be used in this invention. These elastomers are similar to the polyester-urethane elastomers except for the replacement of some or all of the polyester with the polyether. Generally, hydroxy terminated polyethers are utilized along with other active hydrogen containing compounds, either saturated or unsaturated. Polyester elastomers may also be used in this invention. These polyesters are generally prepared from aliphatic diacids of either saturated or unsaturated variety and aliphatic diols generally with the aliphatic groups containing at least eight carbon atoms. Acrylonitrile and methacrylic acid as well as other compounds may be included for the maximum development of impact strength clarity, and other properties.

The elastomers that may be described as non-durable type generally include polybutadiene or similar compounds. These elastomers may be prepared from isoprene, chloroprene, cyanobutadiene, butadiene, with or without other monomers such as alkyl and aryl acrylates and other acrylic monomers, styrene and substituted styrene, acrylonitrile and methacrylonitrile, vinyl halides, vinyl esters, vinylidene halides, olefins, and other cross-linking monomers.

These elastomers may be prepared in suspension, in emulsion, or in solution, and again may be prepared sequentially with different combinations of the above monomers or different concentrations of the above monomers. The elastomers may have attached to them subsequent stages which may be considered rigid. Again these latter rigid stages are not included in the amount of elastomer in the molding composition. These latter stages generally are chosen as to amount and composition to provide dispersibility and compatibility with the rigid thermoplastic to be modified. The hard phase is also chosen to change the refractive index of the elastomer-hard phase particle and to render the elastomer more or less compatible with the hard phase. An example of this type of modifier is the preparation of a solution of stereospecific polybutadiene in a monomer solution similar to that of the thermoplastic polymer to be modified. The monomer is polymerized and the resulting product mixed with the rigid thermoplastic polymer in a concentration sufficient to provide the proper amount of elastomer in the final product. The mixture is then milled or extruded, either before or during the molding of the article. Other examples of this type of elastomer include the polymerization of butadiene or substituted butadiene with or without other monomers such as styrene. Optionally, second or other intermediate stages may include the subsequent polymerization of styrene or an acrylic or methacrylic ester or a combination of all three on those particles held in suspension or emulsion. A final stage may be added by the polymerization of an alkyl methacrylate, alkyl acrylate or styrene or a combination of all three on the particles prepared during the earlier stages. For best handling and performance the outer stage should have higher glass temperature than the inner stage or stages. There are many possibilities for combinations of various monomers both in concentration, composition, and physical and chemical attachment possible. Those skilled in the art will readily consider many additional types that may be used in this invention.

Preferred are those elastomers which have a glass temperature less than 25° C. More preferred are those elastomers having a glass temperature less than 10° C., and most preferred are those elastomers having a glass temperature less than −25° C. In all cases, these glass temperatures refer to the elastomeric portion of the modifier only and do not include any subsequent phases or other polymers attached physically or chemically onto or into the particles of the elastomer. It is preferred that the outer or last phase attached to the elastomer have a glass temperature greater than 25° C.

The acrylic elastomers of this invention include acrylic interpolymers comprising 30 to 80 parts by weight alkyl acrylate units, wherein the alkyl group contains one to eight carbon atoms, 0 to 20 parts by weight of other ethylenically unsaturated units, and 0 to 55 parts by weight of at least one polyunsaturated unit. Preferred are those acrylic elastomers wherein the interpolymer comprises 30 to 80 parts by weight alkyl acrylate units, wherein the alkyl group contains one to eight carbon atoms, 5 to 20 parts by weight other ethylenically unsaturated units, preferably these other ethylenically unsaturated units being aromatic, such as styrene and substituted styrene, and 0 to 5 parts by weight of at least one polyethylenically unsaturated unit. The elastomers of this invention may have a hard phase polymer attached to the elastomer particles preferably in quantities of 10 to 50 parts in proportion of the weights given above. This hard phase polymer preferably comprises at least 50 percent by weight methyl methacrylate units and more preferably comprises 50 to 100 percent by weight methyl methacrylate units, 0 to 50 percent by weight units chosen from the group consisting of alkyl and aryl acrylates and methacrylates and 0 to 20 percent of other ethylenically unsaturated units.

The blend of the elastomer and the rigid thermoplastic may be accomplished by any known method. The rigid thermoplastic and elastomer may be prepared by suspending or dissolving the elastomer in the monomer mix used to prepare the rigid thermoplastic or in a monomer-polymer syrup mix which together will yield the desired rigid acrylic thermoplastic polymer. The elastomer may be placed in the casting mix in the form of particles or as an emulsion, suspension, or solution in water or organic compound. The water or organic compound may be removed before or after casting into the rigid thermoplastic. The elastomer-rigid thermoplastic blend may be milled to form a well dispersed mixture in an extruder, a roll mill or like equipment to prepare the molding composition. The elastomer and the rigid thermoplastic may be blended together while both are in emulsion, suspension or solution in an aqueous or non-aqueous system. The particles are isolated from the water or organic compound by coagulation, spray drying or known means of isolation, and are further processed with or without an intermediate drying step. The preferred method of blending the elastomer and the rigid thermoplastic is by suspending the relatively dry coagulated or spray dried elastomer in the unpolymerized monomer mix for the rigid thermoplastic and polymerizing the monomer to form the rigid thermoplastic with the elastomer intermixed therein. The bulk casting is then granulated and processed in an extruder, mill, or injection molding equipment. The molding compositions of this invention may be prepared by merely mixing the emulsions or suspensions of the acrylic thermoplastic polymer and with that of the elastomer. This may be accomplished by preparing the elastomer, with or without a hard-phase attachment, in emulsion or suspension. Additional emulsifiers or suspending agents may be added to generate new particles. The monomer system used to prepare the rigid thermoplastic polymer is added directly to the suspension and polymerized. Thus, the elastomer modifier and the rigid thermoplastic polymer are prepared in the same emulsion or suspension and may be washed, isolated and processed directly as a one pot molding composition.

The molding compositions of this invention may be opaque, translucent, or clear depending on the refractive index match of the elastomer and the rigid polymer, the particle size of the elastomeric particles intermixed therein, and the concentration of elastomer in the thermoplastic molding composition. It is preferred that the refractive index of the elastomer be chosen and adjusted to match as closely as possible the refractive index of the rigid thermoplastic.

In order to obtain the lowest haze and highest light transmission for the molding compositions of this invention the particle size of the elastomer dispersed in a continuous rigid phase is less than about 1,300 angstroms. However, other advantages either in processing or in the physical properties of the molding compositions are obtained when the particle size of the elastomer is 1,300 angstroms or greater. When the elastomer is dispersed as an emulsion in the continuous rigid thermoplastic phase, the particle size of the elastomer is generally in the range of 500 to 2,500 angstroms. When the elastomer is dispersed as a suspension in the continuous rigid thermoplastic phase, the particle size of the elastomer generally is in the range of 500 angstroms to 1 micron in diameter.

To obtain molding compositions of this invention with the highest clarity, both the refractive index of the elastomer is matched as closely as possible to the refractive index of the rigid acrylic thermoplastic polymer and also the particle size of the elastomer is maintained below 1,300 angstroms.

During the preparation of the elastomer, the rigid thermoplastic or the blends of these two components, many other additives may be included to provide special effects and advantages. It is common to include chain transfer agents such as mercaptans and polymercaptans to control molecular weight. Stabilizers to prevent oxidative attack or resistance to ultraviolet light may also be included. Lubricants such as stearyl alcohol, stearic acid and other commercially available types may also be included for ease of processing. Colorants both organic and inorganic, may be included at any stage of the preparation. These colorants may be either transparent or opaque and may be added with a carrier to provide good dispersion throughout the molding composition.

As indicated above the elastomer may be combined with or have polymerized onto or graft polymerized onto the elastomer backbone or to intermediate stages including hard phases. The amount of hard phase that may be polymerized with the elastomer may vary from only a small amount necessary to improve the processing characteristics and handling characteristics of the elastomer all the way to the full amount of the rigid thermoplastic polymer in the molding composition. It is generally satisfactory to utilize 10 to 100 parts of a rigid phase on 100 parts of the elastomer to provide satisfactory handling characteristics.

The rigid phase polymerized onto and attached physically or chemically to the elastomer may be crosslinked to provide improved dispersibility and physical characteristics in the final molding composition. Generally, as the amount of crosslinking in this rigid phase is increased it is preferred that the molecular weight of this rigid phase be reduced to provide satisfactory flow and dispersibility in the thermoplastic resin.

To assist those skilled in the art to practice the present invention, the following modes of operation are suggested by way of illustration, parts and percentage being by weight unless otherwise specifically noted:

EXAMPLE 1

A monomer charge of 61.5 parts butyl acrylate, 13.5 parts styrene, and 0.4 parts butylene diacrylate is emulsified in water. A fifth of the monomer charge is polymerized using potassium persulfate at elevated temperatures to form a seed. The remaining 80 percent of the monomer charge is added and polymerized while controlling the amount of soap to prevent the formation of a significant number of new particles. While the polymer is retained in emulsion 25 parts methyl methacrylate is polymerized onto the particles preformed in the first stage to improve the handling characteristics of the elastomer. A chain transfer agent may be added to control the molecular weight of the rigid poly methyl methacrylate phase such as 0.1 percent tertiary dodecyl mercaptan. The elastomer modifier is isolated by coagulation in ten volumes of methanol and dried in vacuum. The seed technique is used to prepare larger particle size modifiers and if smaller particle size is desired the seed technique is skipped. Good results are obtained with smaller particle size modifiers.

EXAMPLE 2

An elastomer is prepared by the same procedure of Example 1 except that the monomer charge is 57.4 parts butyl acrylate, 12.6 parts styrene and 0.35 parts butylene diacrylate. The elastomer is retained in emulsion and 30 parts methyl methacrylate with 0.12 parts tertiary dodecyl mercaptan is polymerized on to the elastomeric particles.

EXAMPLE 3

The elastomer with the hard phase attachment is prepared using the procedures of Experiment 1 except that the modifier is isolated by spray drying.

EXAMPLE 4

The procedure of Example 1 is repeated except the monomer charge is 57.4 parts butyl acrylate, 12.6 parts styrene, and 0.35 parts butylene diacrylate. After polymerization 30 parts methyl methacrylate are added and polymerized in contact with the emulsified elastomeric particles. No attempt is made to regulate the molecular weight of the rigid stage.

EXAMPLE 5

The procedure of Example 4 is repeated except the modifier is isolated by spray drying.

EXAMPLE 6

Example 4 is repeated except that the rigid phase monomer system is replaced by 30 parts methyl methacrylate and 0.3 parts 1,3-butylene dimethacrylate.

EXAMPLE 7

The first stage of a two-stage elastomer is prepared by polymerizing in aqueous emulsion using potassium persulfate at elevated temperature a monomer charge of 45.6 parts butyl acrylate, 10.0 parts styrene and 0.28 part butylene diacrylate using 20 percent of this mixture in the seed technique described in Example 1. The second elastomeric stage is prepared by polymerizing onto the first stage a monomer charge of 10.0 parts butyl acrylate, 6.3 parts of t-butylstyrene, and 0.333 part divinylbenzene limiting the amount of emulsifier added to prevent the formation of new particles. The second elastomeric stage is polymerized at elevated temperature using a redox system composed of 0.083 part each diisopropylbenzene hydroperoxide (DIPBHP) and formaldephyde sodium sulfoxylate (FSSO). Again under conditions such that no new particles are formed, a harder phase is polymerized onto the two-stage elastomer; the monomer charge for this harder phase is 27.8 parts methyl methacrylate containing 0.004 part sec.-butyl mercaptan and 0.0333 part DIPBHP. The modifier is isolated by spray-drying. Good results are obtained when the second elastomer stage monomer mixture is 11.3 parts butyl acrylate, 5 parts vinyltoluene and 0.333 part divinylbenzene.

EXAMPLE 8

Example 7 is repeated except that the first elastomeric stage monomer charge is 45.6 parts butyl acrylate, 10.0 parts styrene, and 1.11 parts butylene diacrylate. As in Example 1, 20 percent of this charge is polymerized first as the seed. After polymerization of the first stage monomer system an second stage elastomer monomer system is charged of 10.0 parts butyl acrylate, 6.3 parts t-butylstyrene, 0.333 part 1,3-butylene dimethacrylate, 0.0834 part DIPBHP, and 0.0834 part FSSO. The rigid final stage monomer charge is 27.8 parts methyl methacrylate, 0.003 part sec.-butyl mercaptan and 0.0333 part DIPBHP. The modifier is isolated by spray drying. Again good results are obtained when the second stage elastomer monomer charge is 11.3 parts butyl acrylate, 5 parts vinyltoluene, and 0.333 part 1,3-butylene dimethacrylate.

EXAMPLE 9

A solution of 20.0 parts stereoregular butadiene/styrene (74/26) copolymer, 4.4 parts methyl methacrylate, 36.0 parts styrene, 4.0 parts acrylonitrile, 0.244 part 2,5-dimethyl-2,5-di(t-butyl peroxy)hexane and 0.5 part t-dodecyl mercaptan is polymerized at elevated temperature by normal bulk molding techniques; a charge of 15 parts of this solid polymer is placed in a Banbury mixer and mixed for 10 to 15 minutes. The mixer is then charged with 85 parts of a polymer previously prepared by polymerizing a monomer mixture containing 55 parts methyl methacrylate, 45 parts styrene, 5 parts acrylonitrile and sufficient initiator and mercaptan to give a polymer having a viscosity average molecular weight of about 120,000. The molding composition thus prepared containing 3 percent elastomer is removed from the granulator, diced, and injection molded.

EXAMPLE 10

The procedure of Example 9 is repeated except that the initial charge is 20 parts stereoregular butadiene/styrene (79/21) copolymer, 48 parts methyl methacrylate, 32 parts styrene, and 4 parts acrylonitrile. The acrylic polymer monomer charge is 60 parts methyl methacrylate, 40 parts styrene, and 5 parts acrylonitrile.

EXAMPLE 11

A solution of 16 parts polybutadiene (not stereoregular), 63 parts methyl methacrylate, 21 parts styrene, 4.2 parts acrylonitrile, 0.244 part 75 percent solution t-butyl peroxypivalate, and 0.5 part t-dodecyl mercaptan is polymerized at elevated temperature by normal bulk molding techniques; 17.5 parts of this solid polymer is put on a heated roll mill. After milling for 10 to 15 minutes a charge of 82.5 parts of methyl methacrylate/styrene/acrylonitrile (75/25/5) polymer ($M_v$ is about 120,000) to give a final product containing 2.86 percent elastomer.

EXAMPLE 12

The procedure of Example 11 is repeated except that the initial polymer is prepared from a solution of 12 parts stereoregular polyisoprene, 61.6 methyl methacrylate, 26.4 styrene, 2.2 acrylonitrile (70/30/2.5).

EXAMPLE 13

The modifiers as prepared in Examples 1 through 12 are dispersed in a monomer system of 96 percent methyl methacrylate and 4 percent ethyl acrylate in sufficient quantities to yield 2 to 4 percent elastomer on the total weight of the molding composition. The monomer mix containing the dispersion is polymerized in bulk at elevated temperatures with free radical catalyst using techniques well known in the art. Sufficient chain regulator is employed to provide a viscosity average molecular weight in the range of 75,000 to 200,000, preferably in the range of 85,000 to 180,000. The resulting molding compositions are injection molded into test pieces on which physical properties are obtained. Table I provides typical results obtained with these molding compositions. Control data is supplied on the polymerized monomer mix without any elastomer added. Good results are obtained when the monomer system is replaced with 99 percent to 85 percent methyl methacrylate and 1 to 15 percent ethylacrylate, methylacrylate, and n-butyl acrylate.

methacrylate. The final monomer mix is polymerized onto the particles prepared in the prior stage or stages.

The modifiers are blended on a heated mill with rigid acrylic thermoplastic polymers to yield molding compositions with 1,2,3, and 4 percent elastomer present on the total weight of the compositions. The ductility of the compositions and the resistance to breaking during molding is improved.

I claim:

1. A molding composition of improved ductility and improved processing characteristics comprising: (A) 95.5 to 99.5 percent by weight of a rigid acrylic thermoplastic polymer of 50 to 100 percent of methyl methacrylate and 0 to 50 percent of one or more comonomers selected from the group consisting of other alkyl and aryl methacrylates, alkyl and aryl acrylates, alkyl and aryl acrylamides, substituted alkyl and aryl methacrylates and acrylates and 0 to 10 percent of other unsaturated monomers selected from the group consisting of acrylonitrile and methacrylonitrile, styrene and substituted styrene, vinyl esters, vinyl ethers, vinyl amides, vinyl ketones, vinyl halides, vinylidene halides and olefins, and (B) 4.5 to 0.5 percent by weight of an elastomer based on the weight of the molding composition which elastomer is the product of the polymerization of a monomer mixture comprising: (i) 30 to 80 parts by weight of an alkyl acrylate wherein the alkyl group contains 1 to 8 carbon atoms; (ii) 5 to 20 parts of another copolymerizable ethylenically unsaturated monomer; and (iii) at least some to 5 parts of a copolymerizable polyethylenically unsaturated monomer wherein said elastomer would be further characterized by a glass temperature of less than 10° C. and (C) 10 to 100 parts based on 100 parts elastomer of a final stage attached to and polymerized in the presence of a product containing the elastomer from a monomer mixture comprising at least 50 weight percent of an alkyl methacrylate wherein said final stage would be further characterized by a glass temperature greater than 25° C.

TABLE I

| Blend | Elastomer example number | Percent elastomer | HDT,[1] 264 p.s.i., (° C.) | Flexural deflection at break (inch) | Micro[2] tensile elongation at break (percent) | Total white light transmittance (percent) | Haze (percent) |
|---|---|---|---|---|---|---|---|
| Control | | 0 | 89-93 | 0.4-0.5 | 7-10 | 92.9 | 2.6 |
| 13A | 1 | 2 | 95 | >0.94 | 40.3 | | |
| 13B | 1 | 4 | 92 | >1.07 | 58.7 | | |
| 13C | 2 | 2 | 93 | 0.65 | 37.7 | | |
| 13D | 2 | 4 | 92 | >1.07 | 58.0 | | |
| 13E | 4 | 2 | 95 | >0.86 | 57.3 | | |
| 13F | 4 | 4 | 94 | >1.07 | 61.3 | | |
| 13G | 3 | 2 | 95 | >0.84 | 29.0 | 90.7 | 3.4 |
| 13H | 5 | 2 | 90 | 0.81 | 30.0 | 91.9 | 4.0 |
| 13J | 6 | 2 | 92 | >0.89 | 35.0 | | |
| 13K | 7 | 2.1 | 90 | >0.49 | 32.0 | | |
| 13L | 8 | 2.6 | 90 | >0.69 | 33.0 | | |
| 13M | 9 | 3 | 89 | 1.0 | 50.0 | | 4 |
| 13N | 10 | 3 | 90 | >1.0 | 60.0 | | 1.4 |
| 13P | 11 | 2.86 | 88 | 0.8 | 30.0 | | 4 |
| 13Q | 12 | 3 | 88 | 0.5 | 30.0 | | 4 |

[1] Deflection temperature of plastic under load—ASTM D-648-56.
[2] ASTM D 228-69, run with Type L bar at 0.03 inch/minute.

EXAMPLE 14

The molding composition of Example 13A is injection molded in a complicated, thin-walled dial part under high injection pressure and at high temperatures. No cracking is observed even though the pressure is raised to 1,060 pounds at 580° F. in the front zone of the barrel. A control run using a rigid acrylic thermoplastic polymer without the elastomer produced cracked dials at only 970 pounds injection pressure.

EXAMPLE 15

Elastomers are prepared in emulsion or suspension from a monomer charge of 65 to 100 parts butadiene, 0 to 35 parts styrene, and 0 to 10 parts methyl methacrylate. While maintaining some of the elastomers in emulsion or suspension, 10 to 100 parts of an intermediate stage monomer system, predominately of styrene, is polymerized onto the elastomer particles. Care is taken not to form new particles during this intermediate stage and the final stage by controlling the critical micelle level. A final monomer mix is charged of 10 to 50 parts lower alkyl methacrylates, 0 to 20 parts alkyl acrylates and 0 to 40 parts of other ethylenically and polyethylenically unsaturated monomers such cycloalkyl acrylates and methacrylates, like isobornyl 2. The molding composition of claim 1 wherein the ethylenically unsaturated units are selected from the group consisting of styrene, substituted styrene, alkyl methacrylate, acrylonitrile and methacrylonitrile and the polyethylenically unsaturated units are selected from the group consisting of 1,3-butylene diacrylate and dimethacrylate, trimethylolpropane trimethacrylate, di- and trivinyl benzene, vinyl acrylate and methacrylate, allyl and methallyl acrylates and methacrylates, and bis-acrylamides.

3. The molding composition of claim 1 wherein the elastomer comprises more than one stage prepared sequentially.

4. The molding composition of claim 1 wherein said final stage is polymerized from a monomer mixture comprising a crosslinking monomer and at least 50 weight percent methyl methacrylate.

5. The molding composition of claim 1 wherein said elastomer is polymerized from a monomer mixture comprising butyl acrylate, styrene and butylene diacrylate.

6. The molding composition of claim 5 wherein said final stage is polymerized from a monomer mixture consisting essentially of methyl methacrylate.

7. The molding composition of claim 1 comprising 99 to 96 percent rigid acrylic thermoplastic polymer and 1 to 4.0 percent elastomer.

8. The molding composition of claim 1 wherein the rigid acrylic themoplastic polymer is polymerized from a monomer mixture comprising at least 50 percent by weight methyl methacrylate.

9. The molding composition of claim 1 wherein the rigid acrylic thermoplastic polymer is polymerized from a monomer mixture comprising 90 to 100 percent by weight of alkyl and aryl esters of acrylic and methacrylic acid.

10. The molding composition of claim 1 wherein the rigid acrylic thermoplastic polymer is polymerized from a monomer mixture comprising 90 to 100 percent by weight methyl methacrylate.

* * * * *